(12) United States Patent
Maehara

(10) Patent No.: US 7,787,871 B2
(45) Date of Patent: Aug. 31, 2010

(54) MOBILE COMMUNICATION TERMINAL AND COMMUNICATION CONTROL PROGRAM

(75) Inventor: Kazuyoshi Maehara, Higashimurayama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 556 days.

(21) Appl. No.: 11/593,256

(22) Filed: Nov. 6, 2006

(65) Prior Publication Data

US 2007/0165798 A1 Jul. 19, 2007

(30) Foreign Application Priority Data

Dec. 28, 2005 (JP) ............................. 2005-379866

(51) Int. Cl.
*H04M 3/42* (2006.01)
*H04L 12/58* (2006.01)
*H04B 1/18* (2006.01)
*H04M 1/00* (2006.01)

(52) U.S. Cl. ................. 455/415; 455/412.1; 455/178.1; 455/553.1; 379/157; 379/163

(58) Field of Classification Search ................. 455/415, 455/461, 551, 33, 410, 412.1, 178.1, 553.1; 379/88.19, 207.01, 207.02, 202.01, 210.01, 379/58, 188, 207, 157, 163
See application file for complete search history.

(56) References Cited

U.S. PATENT DOCUMENTS 5,448,622 A * 9/1995 Huttunen ..................... 455/551
5,592,546 A * 1/1997 Takahashi ............... 379/355.05
6,928,151 B2 * 8/2005 Yamada et al. .............. 379/188

FOREIGN PATENT DOCUMENTS

| JP | 05-284103 | 10/1993 |
|---|---|---|
| JP | 2007-274255 | 10/1995 |
| JP | 2002-291043 | 10/2002 |
| JP | 2003-143646 | 5/2003 |
| JP | 2004-350226 | 12/2004 |
| JP | 2005-072931 | 3/2005 |
| JP | 2005-184537 | 7/2005 |

OTHER PUBLICATIONS

Office Action dated May 19, 2008 issued for the counterpart Japanese Patent Application No. 2005-379866, (3 pgs.).

* cited by examiner

*Primary Examiner*—Nick Corsaro
*Assistant Examiner*—Manpreet S Matharu
(74) *Attorney, Agent, or Firm*—Cohen Pontani Lieberman & Pavane LLP

(57) ABSTRACT

A cellular phone 100 registers incoming call histories in which other party telephone numbers are correlated to own telephone numbers which received a call in an incoming call history accommodation section 14b. It is judged whether or not the other party telephone number to which a call is made is the other party telephone number from which a call was received previously with reference to the incoming call histories when transmitting a call. If the other party telephone number is an other party telephone number which was received previously, the own telephone number which was used at that time is extracted from the incoming call histories and a call transmission is made. Accordingly, this enables preventing the error in using different plurality of own telephone numbers.

7 Claims, 12 Drawing Sheets

MOBILE COMMUNICATION TERMINAL AND COMMUNICATION CONTROL PROGRAM

CROSS-REFERENCE TO RELATED APPLICATION

This application is based upon and claims the benefit of priority from the prior Japanese Patent Application No. 2005-379866, filed Dec. 28, 2005, the entire contents of which is incorporated herein by reference.

BACKGROUND OF THE INVENTION

1. Field of the Invention

The present invention relates to a mobile communication terminal for selectively using a plurality of pieces of own identification information and a program thereof.

2. Description of the Related Art

Conventionally, a portable wireless terminal has been proposed in which a plurality of own (personal) telephone numbers have been registered in a User Identity Module (UIM) card and a communication is made using a telephone number selected by operation by a user. A portable wireless terminal of this type is disclosed in, for example, the Japanese Laid-Open (Kokai) Patent Publication No. H05-284103 (1993).

Meanwhile, in a portable wireless terminal in which a plurality of own telephone numbers are selectively used, different numbers are used according to usage. For example, business telephone numbers and private telephone numbers are used separately.

However, if there is a mistake in differentiation of the telephone numbers, a private telephone number may be used to originate a call to a party on the other end of the call to whom a call is supposed to be made using a business telephone number, or a business telephone number may be made to originate a call to a party on the other end of the call to whom a call is supposed to be made using a private telephone number only. As a result of this, there is a drawback that a telephone number which has not been known to the party on the other end of the call becomes known to him or her. Also for the party on the other end of the call, there is a drawback that he or she gets confused because he or she does not know who is calling when he or she receives a call from an unknown telephone number.

SUMMARY OF THE INVENTION

In accordance with an aspect of the present invention, there is provided a mobile communication terminal for selectively using a plurality of pieces of own identification information for communication, comprising: a communication history storage means for storing communication histories by correlating the other party identification information of a communication terminal of a party on the other end of the call to the own identification information used in the communication; an extraction means for extracting the own identification information to be used for the communication, when initiating a communication with the communication terminal of the other party, on the basis of the other party identification information of the communication terminal of the other party and the communication histories stored in the communication history storage means; and a communication initiation means for initiating a communication with the communication terminal of the other party using the own identification information extracted by the extraction means.

In accordance with another aspect of the present invention, there is provided a mobile communication terminal for selectively using a plurality of pieces of own identification information for communication, comprising: an outgoing call history storage means for storing an outgoing call history by correlating the other party identification information of a communication terminal of the other part to which a call is made to the own identification information used in the call transmission; an incoming call history storage means for storing an incoming call history by correlating the other party identification information of a communication terminal of the other party from which a call is received to the own identification information used in the call receipt; a first determination means for determining whether or not the other party identification information of the communication terminal of the other party is the other party identification information to which a call was made previously with reference to the outgoing call histories stored in the outgoing call history storage means, when initiating a communication with the communication terminal of the other party, a first extraction means for extracting the own identification information correlated to the other party identification information from the outgoing call histories stored in the outgoing call history storage means, when the first determination means determines that the other party identification information is not the other party identification information to which a call was made previously; a second determination means for determining whether or not the other party identification information of the communication terminal of the other party is the other party identification information from which a call was received previously with reference to the incoming call histories stored in the incoming call history storage means, when the first determination means determines that the other party identification information is not the other party identification information which was received previously; a second extraction means for extracting the own identification information correlated to the other party identification information from the incoming call histories stored in the incoming call history storage means, when the second determination means determines that the other party identification information is the other party identification information which was received previously; and a communication initiation means for initiating a communication with the communication terminal of the other party using the own identification information extracted by either one of the first extraction means or the second extraction means.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

A. First Embodiment

A-1. Configuration

Figure 1:
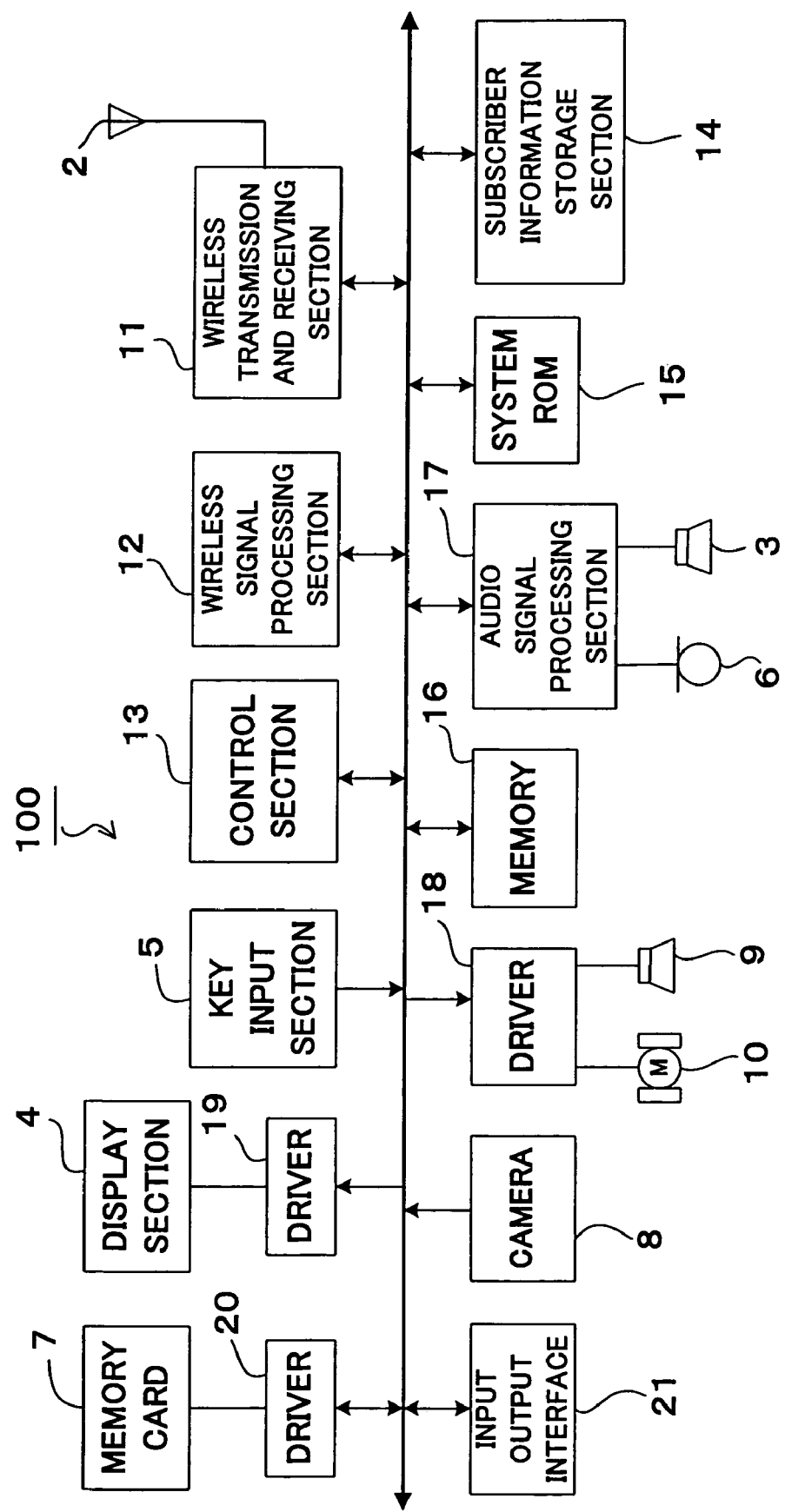
FIG. 1 is a block diagram of a configuration of a cellular phone according to a first embodiment of the present invention.

FIG. 1 is a block diagram showing a configuration of a cellular phone 100 (a mobile communication terminal) according to a first embodiment of the present invention. The cellular phone 100 has a body configuration, for example, of a folding retractable type. A body case (not shown) thereof is provided with an antenna 2 for transmission and reception, a speaker 3 for generating a voice, a display section 4 configured by a color liquid crystal panel and the like, a key input section 5, a microphone 6 for inputting a voice, a memory card 7 which is a memory medium which is attachable and detachable and allowing data to be read out from and written to, a camera 8 for picking up an image, a speaker 9 for alerting receipt of a call, and a vibrator 10 for altering receipt of a call by vibration.

The key input section 5 is provided with various exclusive switches and functional switches to which various functions are assigned. As the representative exclusive switches, a power switch for turning ON and OFF power, and an off-hook/on-hook switch which is operated when a call is initiated/a line is disconnected and the like are provided. While a wireless transmission and receiving section 11 amplifies a high frequency signal it has received through the antenna 2 and outputs it to a wireless signal processing section 12 subsequent thereto, it amplifies using high frequency a transmission signal outputted from the wireless signal processing section 12 and sends it from the antenna 2.

While the wireless signal processing section 12 demodulates the high frequency signal amplified by the wireless transmission and receiving section 11, it generates a transmission signal which is created by modulating the transmission data supplied from the control section 13. The control section 13 controls the entire apparatus by sending and receiving a command and data through the system bus. The operation of the control section 13 related to the summary of the present invention will be described later. The subscriber information storage section 14, storing not only an own telephone number but also outgoing call histories and incoming call histories, corresponds to a communication history storage means. The configuration of the subscriber information storage section 14 will be described later.

A system ROM 15 stores not only a program executed by the control section 13 but also various display data for forming a standby display and the like. Note that the program executed by the control section 13 includes processing at call reception, processing at call transmission, own telephone number extraction processing, outgoing call history storage processing and processing at communication termination, which will be described later. The control section 13 actualizes functions of an extraction means, a communication initiation means, a judgment means, and a detection means.

A memory 16 has a work area for temporarily storing various register flag data to be used for the processing by the control section 13, a mail area for storing mail addresses and mails transmitted and received, and an image data for storing image pickup data supplied from the camera 8.

An audio signal processing section 17 performs a digital-to-analog (D/A) conversion of audio data during communication to an audio signal so as to generate a sound from the speaker 3, and performs an analog-to-digital (A/D) conversion of an audio signal outputted from the microphone 6 to audio data so as to input the audio data to the control section 13. A driver 18 drives a light emitting device (LED) provided in the camera 8, the speaker 9 for alerting receipt of a call, and the vibrator 10. A driver 19 drives to display the display section 4 in accordance with an instruction by the control section 13. A driver 20 reads the data from and writes to the memory card 7 in accordance with the instruction of the control section 13. The memory card 7 includes a data area for accommodating the data transferred from the data area of the memory 16 in accordance with the instruction by the control section 13. An input output interface 21 transmits and receives data with an external device which is connected thereto via a serial interface such as a USB cable under the control of the control section 13.

A-2. Configuration of the Subscriber Information Storage Section 14

Figure 2:
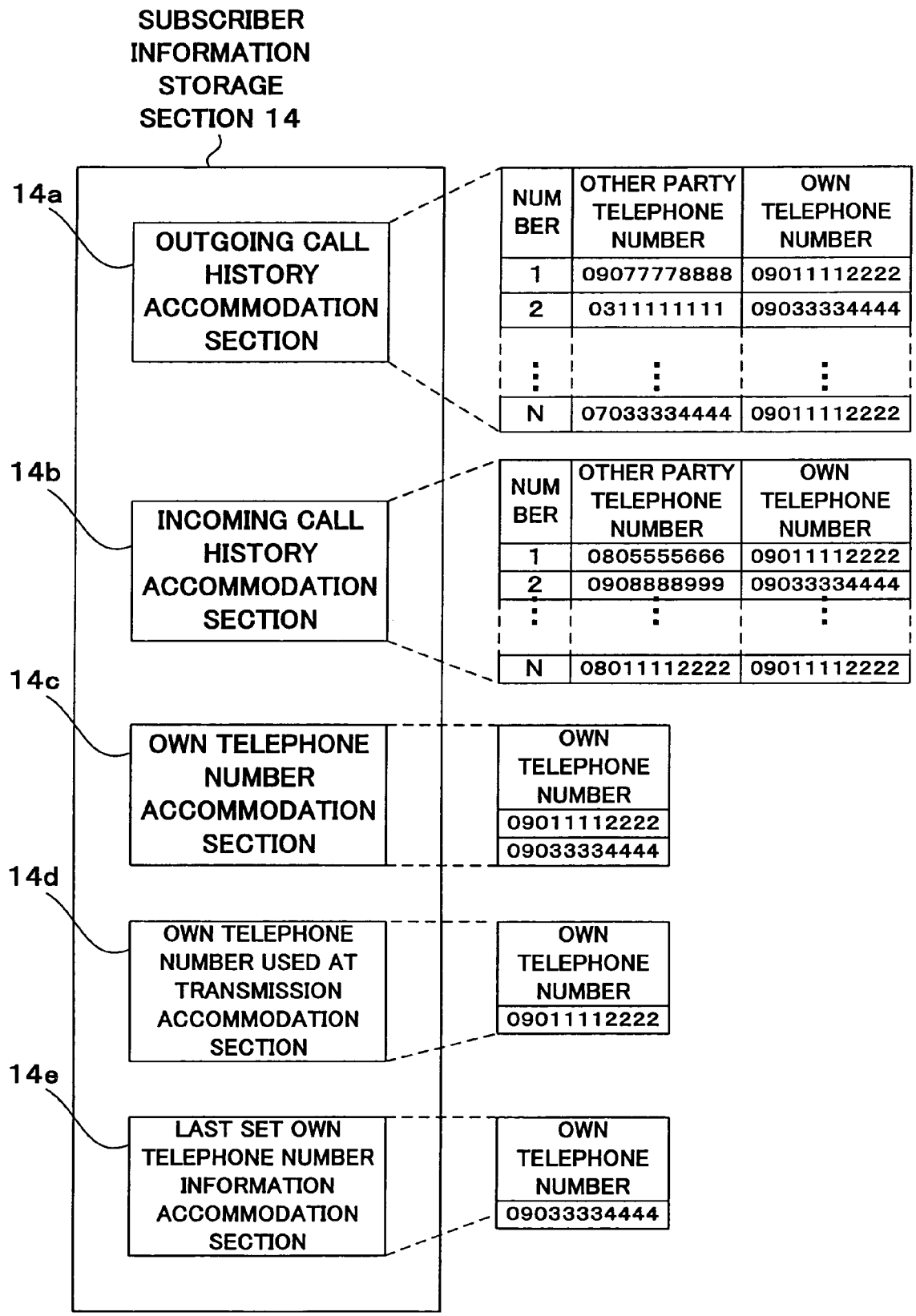
FIG. 2 is a diagram of a configuration of a subscriber information storage section 14.

FIG. 2 is a diagram showing a configuration of the subscriber information storage section 14. As shown in the drawing, the subscriber information storage section 14 is configured by an outgoing call history accommodation section 14a, an incoming call history accommodation section 14b, an own telephone number accommodation section 14c, an own telephone number used at transmission accommodation section 14d, and a last set own telephone number information accommodation section 14e. The outgoing call history accommodation section 14a stores outgoing call histories in which an other party telephone number to which a call is made is correlated to the own telephone number which was used for transmission. The incoming call history accommodation section 14b stores incoming call histories in which the other party telephone number from which a call is received to the own telephone number which received the call.

In this case, the own telephone number corresponds to the own identification information, and the other party telephone number corresponds to the concept of the other party identification information. The outgoing call histories and the incoming call histories correspond to the concept of the communication histories.

A plurality of own (personal) telephone numbers are registered in the own telephone number accommodation section 14c. Here, own telephone numbers include, for example, business telephone numbers and private telephone numbers or the like. In the case where an own telephone number which was once registered is disabled because of cease of use or the like, the own telephone number will be deleted from the own telephone number accommodation section 14c. The own telephone number which will be used for transmission is registered in the own telephone number to be used for the own telephone number used at transmission accommodation section 14d. In the case where an own telephone number other than the own telephone number stored in the own telephone number used at transmission accommodation section 14d is to be used, the own telephone number used for transmission is saved and accommodated in the immediately preceding own telephone number information accommodation section 14e.

A-3. Operations

Next, the operations of the processing at call reception, the processing at call transmission, the own telephone number extraction processing, the outgoing call history storage processing and the processing at communication termination, which are executed by the control section 13 of the cellular phone 100 with the above-described configuration, will be respectively described with reference to FIGS. 3 to 8.

A-3-a. Operation of Processing at Call Reception

Figure 3:
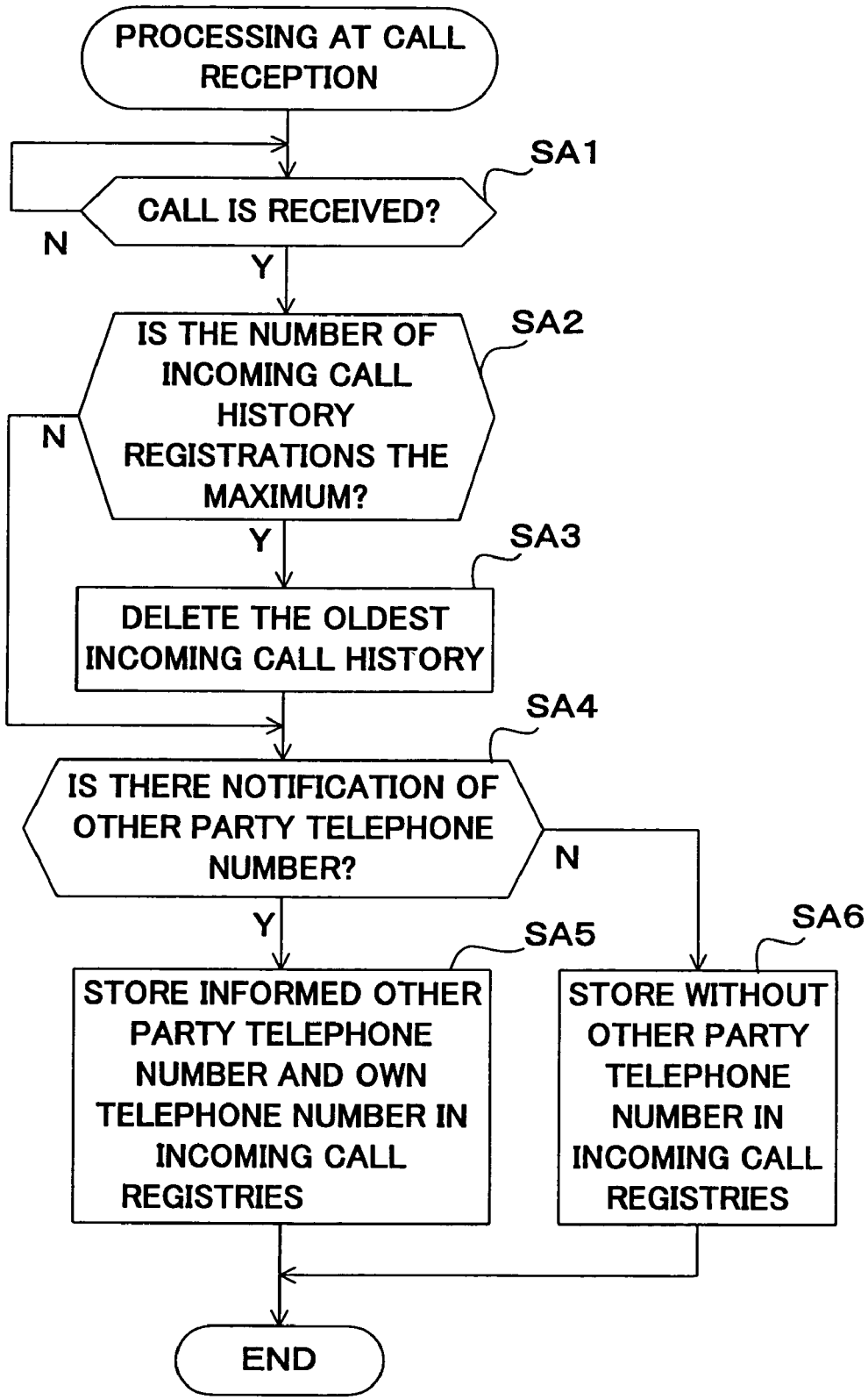
FIG. 3 is a flowchart of an operation of processing at call reception.

In the cellular phone 100 in which the power is set into the ON state in accordance with the operation of a power switch, the control section 13 executes the processing at call reception as shown in FIG. 3, and advances the processing to Step SA1. In Step SA1, the control section 13 stands by until a call is received. When a call is received, the judgment result in this step is "YES," and the processing advances to Step SA2. In Step SA2, it is judged whether or not the number of incoming call history registrations of the above-described incoming call history accommodation section 14b (See FIG. 2) has reached the maximum. If the number of registrations has not reached the maximum, the judgment result is "NO," and the processing advances to Step SA4 which follows.

On the other hand, if the number of registrations has reached the maximum, the judgment result of the above-described Step SA2 is "YES," and the processing advances to Step SA3, in which the oldest incoming call history of the incoming call histories registered in the incoming call history accommodation section 14b is deleted. Next, in Step SA4, it is judged whether or not there is an other party telephone number notification, that is, whether or not the incoming call is the one for which notification of the caller number is provided. If the incoming call is the one for which notification of the caller number is provided, the judgment result is "YES," and the processing advances to Step SA5. In Step SA5, the other party telephone number (the caller number) for which notification was provided is correlated to the own telephone number which received the call, and the history thereof is registered in the incoming call history accommodation section 14b, and the present processing is terminated. On the other hand, if the incoming call is the one for which notification of the caller number is not provided, the judgment result of the above-described Step SA4 is "NO," and the processing advances to Step SA6. In Step SA6, the own telephone which received the call is correlated as "no other party telephone number," and the history thereof is registered in the incoming call history accommodation section 14b and the present processing is terminated.

A-3-b. Operation of Processing at Call Transmission

Figure 4:
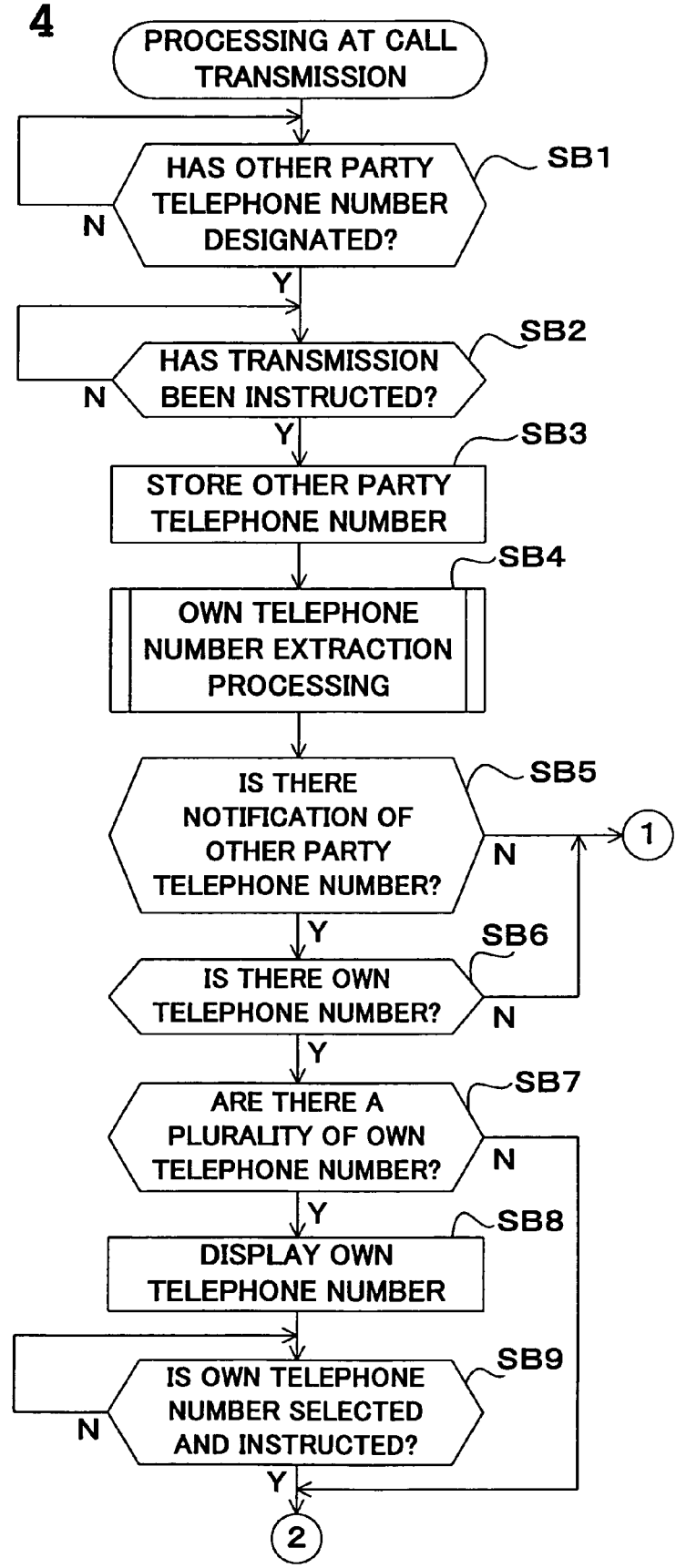
FIG. 4 is a flowchart of an operation of processing at call transmission.
Figure 5:
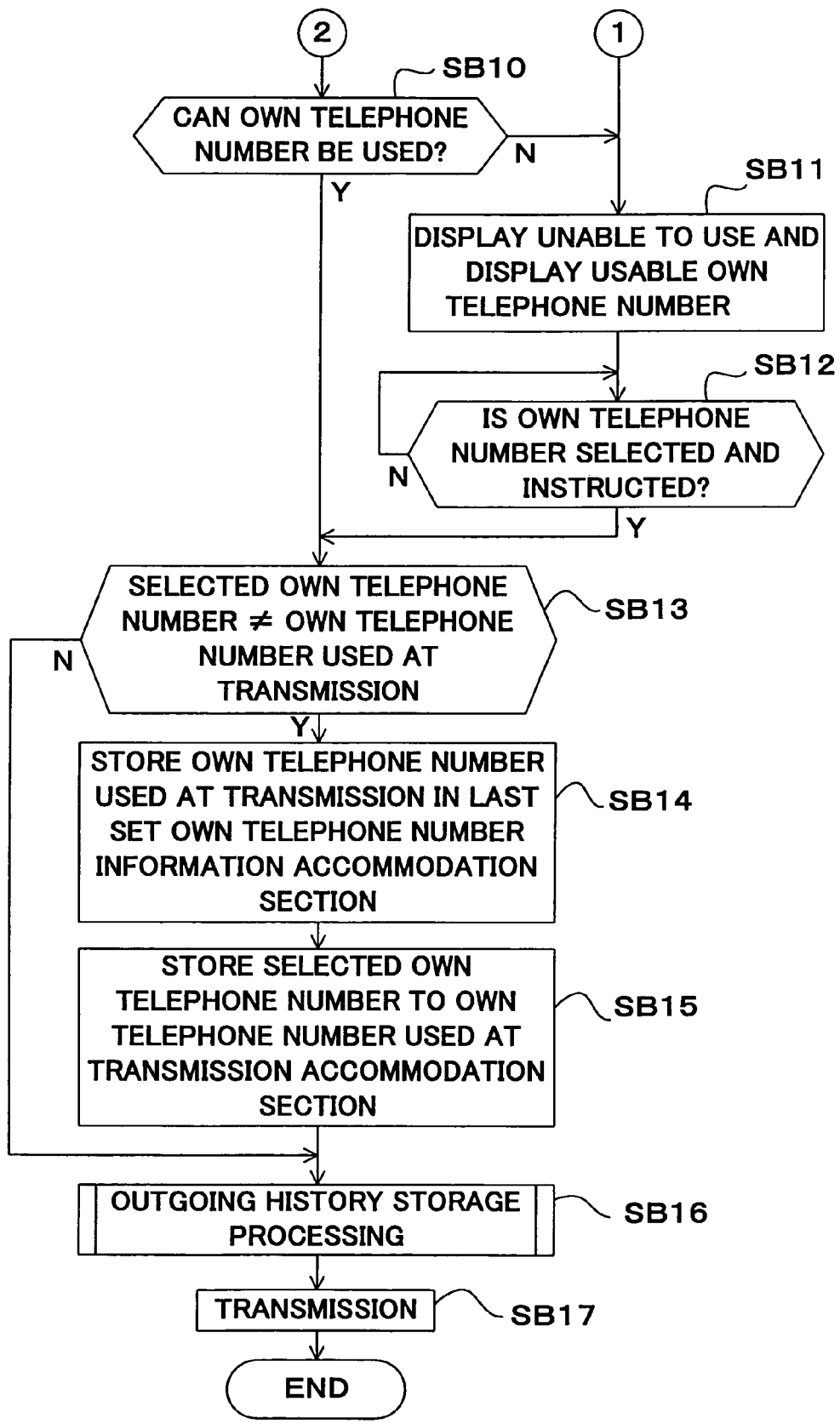
FIG. 5 is a flowchart of an operation of processing at call transmission.

Next, the operation of the processing at call transmission will be described with reference to FIG. 4. In the standby state, the control section 13 executes the processing at call transmission shown in FIG. 4, and advances the processing to Step SB1, in which it judges whether or not there is a key input for designating the other party telephone number. If a key input for designating the other party telephone number is executed, the judgment result is "YES," and the processing advances to Step SB2. In Step SB2, the control section 13 stands by until the off-hook switch is operated. When a transmission instruction is generated by the operation of the off-hook switch, the judgment result in this step is "YES," and the processing advances to Step SB3, in which the designated other party telephone number is temporarily stored in the work area of the memory 16.

Subsequently, in Step SB4, the own telephone number extraction processing is executed. In the own telephone number extraction processing, it is judged whether or not the other party telephone number for which transmission instruction is made is an other party telephone number which was received previously, with reference to the incoming call histories, as will be described later. If the other party telephone number is a telephone number which was received previously, the own telephone number used at that time is extracted from the incoming call histories. Next, in Step SB5, it is judged whether or not the other party telephone number to which a call is made is included in the incoming call histories of the incoming call history accommodation section 14b. If included, the judgment result is "YES," and the processing advances to Step SB6. If not included, the judgment result is "NO," and the processing advances to Step SB11 (see FIG. 5) to be described later.

In Step SB6, it is judged whether or not the own telephone number correlated to the other party telephone number to which a call is made is included in the incoming call histories of the incoming call history accommodation section 14b. If included, the judgment result is "YES," and the processing advances to Step SB7, and if not included, the judgment result is "NO," and the processing advances to Step SB11 (see FIG. 5), to be described later.

In Step SB7, it is judged whether or not a plurality of the own telephone numbers correlated to the other party telephone number to which a call is made have been registered in the incoming call histories of the incoming call history accommodation section 14b, that is, whether or not a plurality of the own telephone numbers correlated to the other party telephone number to which a call is made have been extracted from the incoming call histories by the own telephone number extraction processing in the above-described Step SB4. If a plurality of the own telephone numbers have not been extracted, the judgment result is "NO," and the processing advances to Step SB10 (see FIG. 5) to be described later. On the other hand, if a plurality of the own telephone numbers have been extracted, the judgment result is "YES," and the processing advances to Step SB8, in which the extracted plurality of the own telephone numbers are displayed in the display section 4.

Further, in Step SB9, the control section 13 stands by until one of the plurality of own telephone numbers displayed in the display section 4 is selected and instructed. When one of the own telephone numbers is selected by the key operation by the user, the judgment result in this step is "YES," and the processing advances to Step SB10 shown in FIG. 5. In Step SB10, it is judged whether or not the selected own telephone number is usable. That is, search is made on whether or not the selected own telephone number is included in the own telephone numbers stored in the own telephone number accommodation section 14c. For example, the selected own telephone number is disabled because of cease of use or the like, the selected own telephone number is not included in the own telephone numbers stored in the own telephone number accommodation section 14c, the judgment result is "NO," and the processing advances to Step SB11.

In Step SB11, the selected own telephone number is displayed in the display section 4. At the same time, the own telephone numbers that may be used, that is, the own telephone numbers stored in the own telephone number accommodation section 14c, are displayed. Further, in Step SB12, on the basis of the contents displayed by the above-described Step SB11, the control section 13 stands by until an own telephone number that may be used is selected and instructed. When one own telephone number is selected by the key operation by the user, the judgment result in this step is "YES," and the processing advances to Step SB13. Further, in Step SB13, it is judged whether or not the selected own telephone number differs from the own telephone number stored in the own telephone number used at transmission accommodation section 14d. If the selected own telephone number agrees with the own telephone number stored in the own telephone number used at transmission accommodation section 14d, the judgment result is "NO," a and the processing advances to Step SB16, to be described later.

On the other hand, if the selected own telephone number differs from the own telephone number stored in the own telephone number used at transmission accommodation section 14d, the judgment result of the above-described Step SB13 is "YES," and the processing advances to Step SB14. In Step SB14, the own telephone number stored in the own telephone number used at transmission accommodation section 14d is stored in the last set own telephone number information accommodation section 14e. Next, in Step SB15, the selected own telephone number is stored in the own telephone number used at transmission accommodation section 14d. Further, the processing advances to Step SB16, in which the outgoing call history storage processing (to be described later) is executed of registering the outgoing call history in which the other party telephone number is correlated to the own telephone number registered in the own telephone number used at transmission accommodation section 14d is registered in the outgoing call history accommodation section 14a. Thereafter, the transmission is made to the network end in Step SB17, and the present processing is terminated.

A-3-c. Operation of Own Telephone Number Extraction Processing

Figure 6:
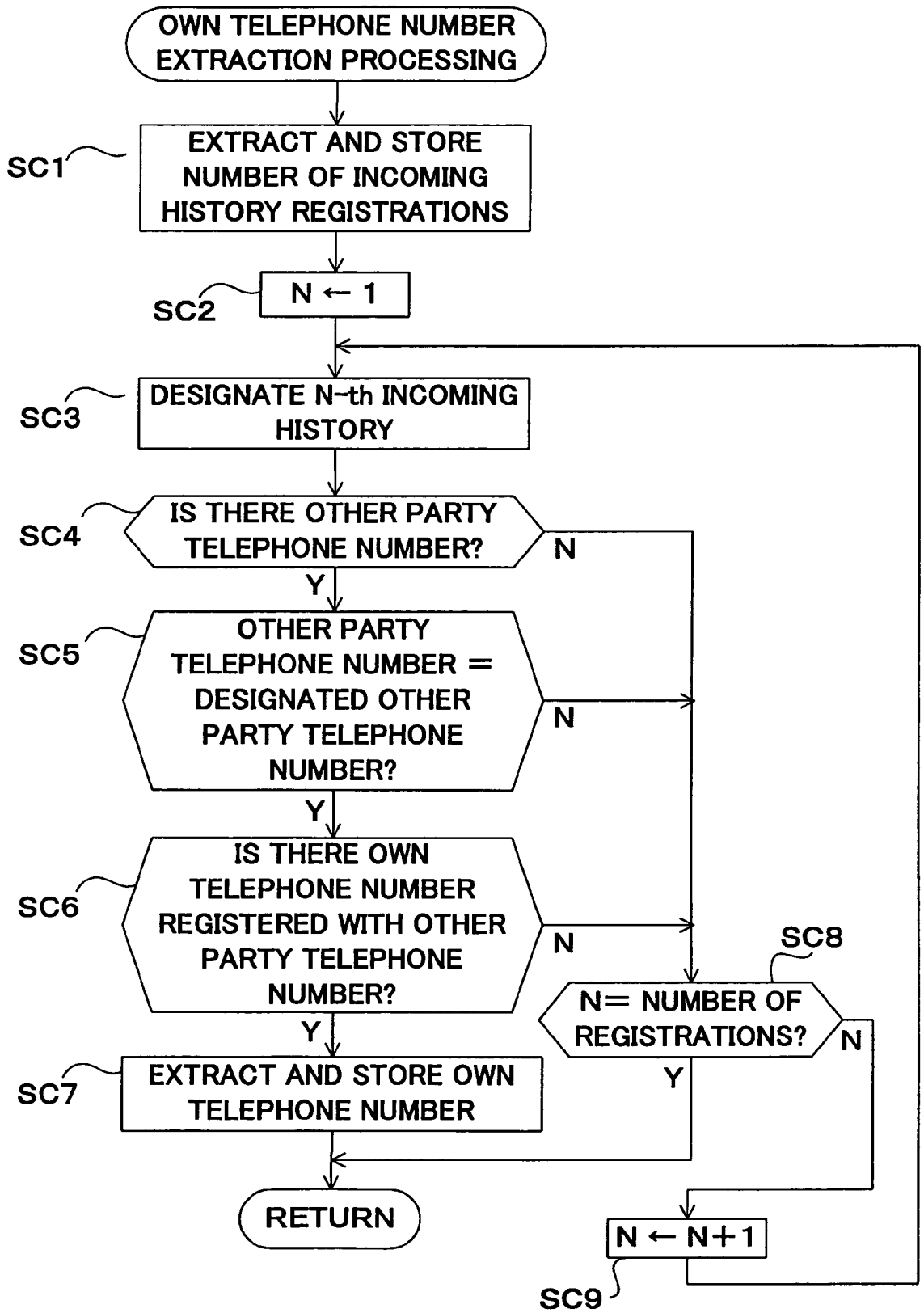
FIG. 6 is a flowchart of an operation of own telephone number extraction processing.

Next, the operation of the own telephone number extraction processing will be described with reference to FIG. 6. When the present processing is executed through Step SB4 (see FIG. 4) of the above-described processing at call transmission, the control section 13 advances the processing to Step SC1 shown in FIG. 6, in which the number of incoming call history registrations in the incoming call history accommodation section 14b is extracted. Subsequently, in Step SC2, the default value "1" is stored to a pointer N for designating the incoming call history number. Note that the default value "1" is a value for designating the latest (leading-off) history in the incoming call histories.

Next, in Step SC3, the Nth incoming call history designated by the pointer N out of the incoming call histories registered in the incoming call history accommodation section 14b is designated. Further, in Step SC4, it is judged whether or not the other party telephone number has been registered in the designated incoming call history. If the other party telephone number has not been registered, the judgment result is "NO," and the processing advances to Step SC8. In Step SC8, it is judged whether or not the value of the pointer N has reached the number of incoming call history registrations extracted in the above-described Step SC1, that is, whether or not search of all incoming call histories is complete. If the search of all incoming call histories is complete, the judgment result is "YES," and the present processing is terminated. However, if the search is not complete, the judgment result is "NO," the processing advances to Step SC9, in which a pointer N is incremented for stepping, and the processing is returned to the above-described Step SC3.

Further, if the other party telephone number has been registered in the incoming call history designated by the incremented pointer N, the judgment result of the above-described Step SC4 is "YES," and the processing advances to Step SC5. In Step SC5, it is judged whether or not the other party telephone number stored in the incoming call history designated by the pointer N agrees with the other party telephone number temporarily stored in the work area of the memory 16 in the above-described Step SB3 (see FIG. 4), that is, whether or not the other party telephone number is an other party telephone number which was received previously. If the other party telephone number is not an other party telephone number which was received previously, that is, if a call is made to the other party telephone number for the first time, the judgment result is "NO," and the processing advances to Step SC8.

On the other hand, if the other party telephone number is an other party telephone number which was received previously, the judgment result of the above-described Step SC5 is "YES," and the processing advances to Step SC6. In Step SC6, it is judged whether or not an own telephone number has been registered together with the other party telephone number in the incoming call history designated by the pointer N. If an own telephone number has not been registered together with the other party telephone number, the judgment result is "NO," and the processing is advanced to Step SC8. On the other hand, if an own telephone number has been registered together with the other party telephone number, the judgment result is "YES," the processing advances to Step SC7, in which the own telephone number is extracted from the incoming call histories and temporarily stored in the work area of the memory 16, and the present processing is terminated.

As described above, in the own telephone number extraction processing, it is judged whether or not the other party telephone number to which a call is to be made has been registered in the incoming call histories, that is, whether or not the other party telephone number is an other party telephone number which was received previously, with reference to the incoming call histories. If it is an other party telephone number which was received previously, the own telephone number which was used at that time is extracted from the incoming call histories.

A-3-d. Operation of Outgoing Call History Storage Processing

Figure 7:
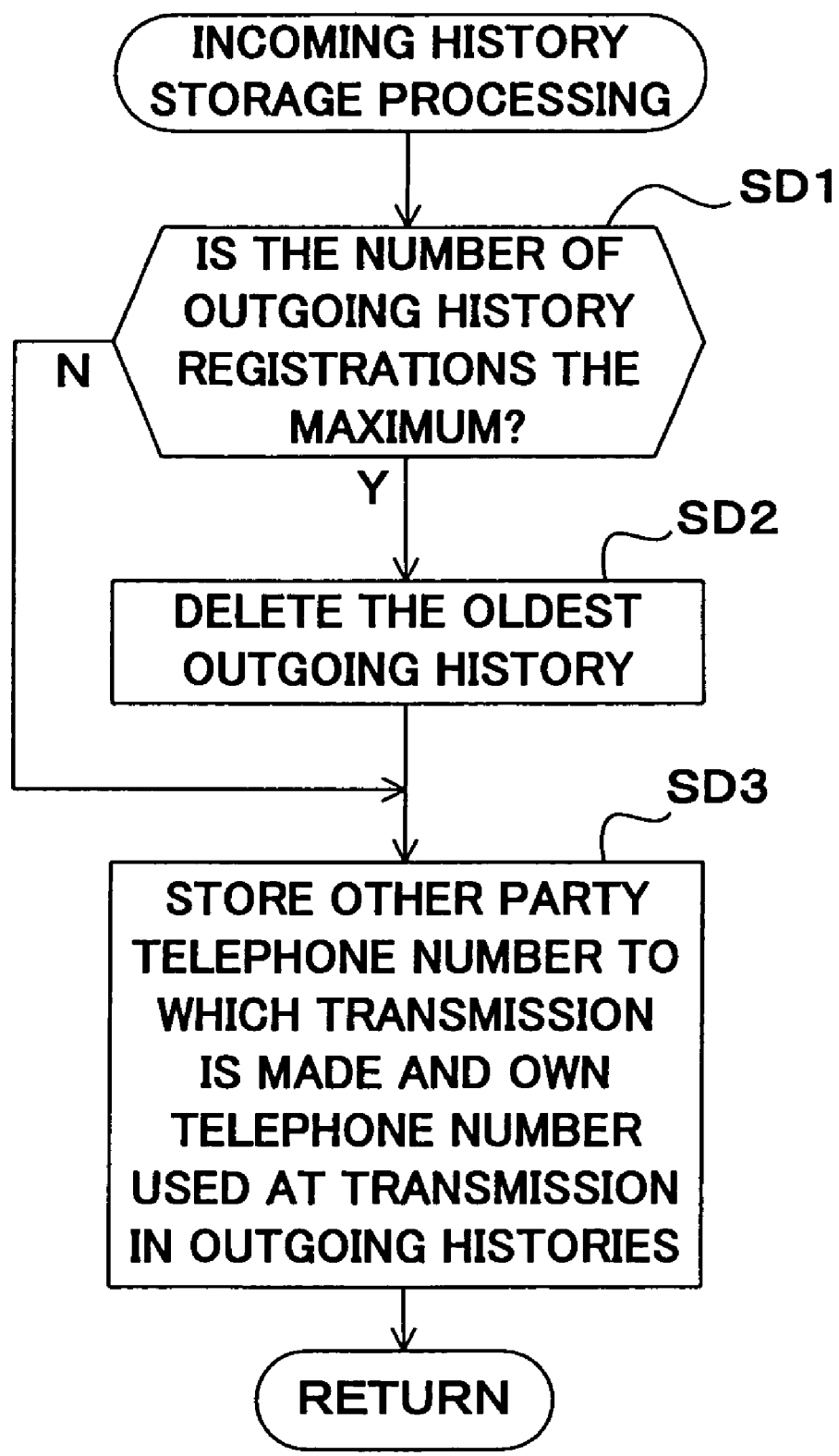
FIG. 7 is a flowchart of an operation of outgoing call history storage processing.

Next, the operation of the outgoing call history storage processing will be described with reference to FIG. 7. When the present processing is executed via Step SB16 (see FIG. 5) of the above-described processing at call transmission, the control section 13 advances the processing to Step SD1 shown in FIG. 7, in which it judges whether or not the number of outgoing call history registrations in the outgoing call history accommodation section 14a has reached the maximum. If the number of registrations has not reached the maximum, the judgment result is "NO," the processing advances to Step SD3, in which the outgoing call history in which the other party telephone number to which a call is made is correlated to the own telephone number registered in the own telephone number used at transmission accommodation section 14d, is registered in the outgoing call history accommodation section 14a, and the present processing is terminated. On the other hand, if the number of registrations has reached the maximum, the judgment result of the above-described Step SD1 is "YES," and the processing advances to Step SD2, in which the oldest outgoing call history is deleted. After that, in Step SD3, the outgoing call history in which the other party telephone number to which a call is made is correlated to the own telephone number registered in the own telephone number used at transmission accommodation section 14d is registered in the outgoing call history accommodation section 14a, and the present processing is terminated.

A-3-e. Operation of Processing at Communication Termination

Figure 8:
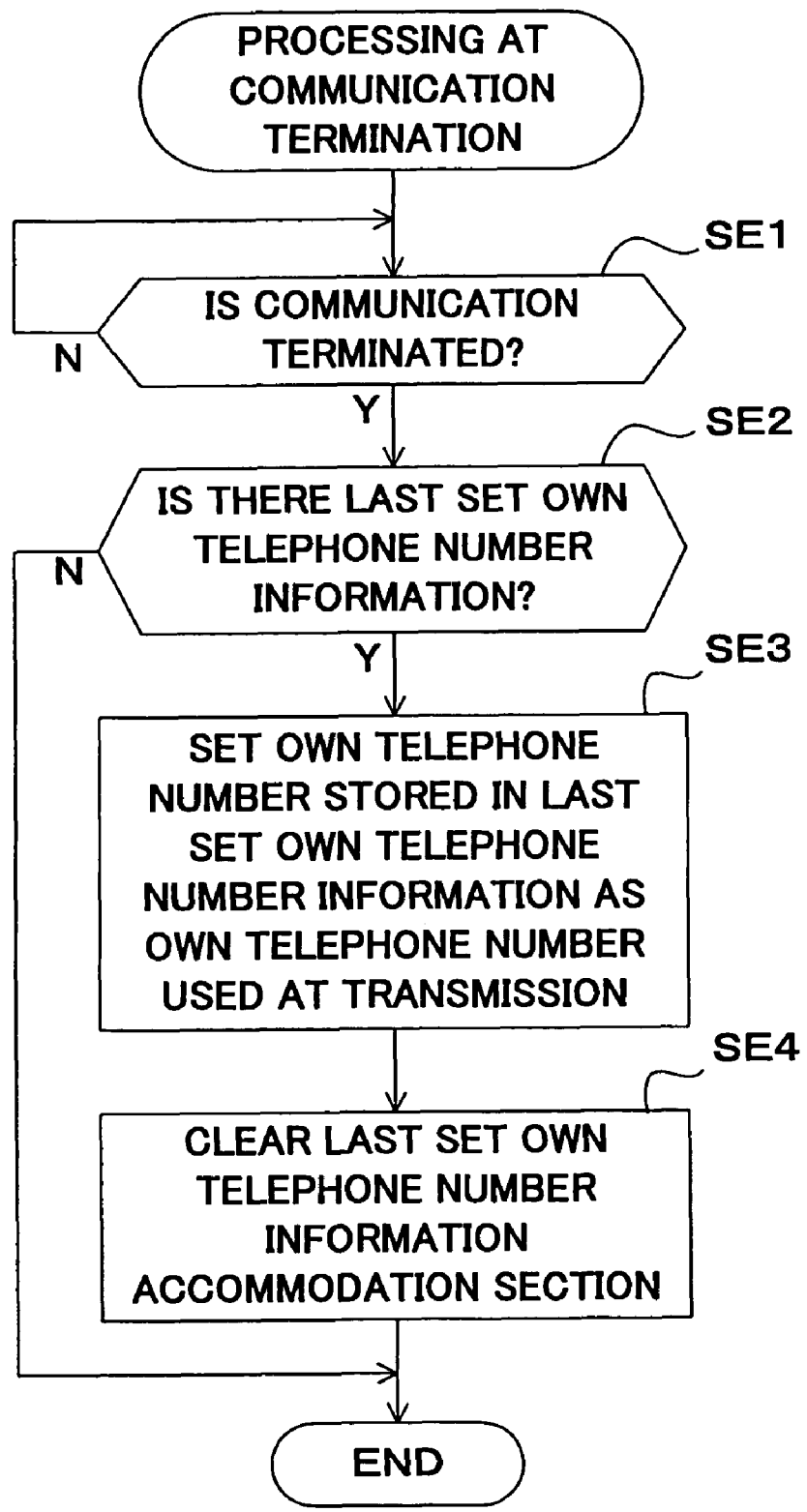
FIG. 8 is a flowchart of an operation of processing at communication termination.

Next, the operation of the processing at communication termination will be described with reference to FIG. 8. The control section 13 executes the processing at communication termination shown in FIG. 8 in accordance with an on-hook switch operation at the communication termination, and the processing advances to Step SE1. Upon termination of the communication, the judgment result in this step is "YES," and the processing advances to Step SE2. In Step SE2, it is judged whether or not the own telephone number is stored in the last set own telephone number information accommodation section 14e (see FIG. 2) provided in the subscriber information storage section 14. If the own telephone number has not been stored, the judgment result is "NO," and the present processing is terminated without executing any processing.

On the other hand, if the own telephone number has been registered, the judgment result of the above-described Step SE2 is "YES," and the processing advances to Step SE3. In Step SE3, the own telephone number stored in the last set own telephone number information accommodation section 14e is registered in the own telephone number used at transmission accommodation section 14d (see FIG. 2). Further, the processing advances to Step SE4, in which the last set own telephone number information accommodation section 14e is cleared and the present processing is terminated.

As described above, according to the first embodiment, the incoming call histories in which the other party telephone number is correlated to the own telephone number which has received the incoming call are registered in the incoming call history accommodation section 14b. When a call transmission is made, it is judged whether or not the other party telephone number to which a call is made is an other party telephone number which was received previously with reference to the incoming call histories. If the other party telephone number is an other party telephone number which was received previously, the own telephone number which was used at that time is extracted from the incoming call histories, and a call transmission is made. This enables preventing the error in separate use of a plurality of own telephone numbers. In other words, it is possible to prevent an own telephone number other than the own telephone number known to the other party of the communication among the plurality of own telephone numbers from being used for transmission because of an operational error or misunderstanding of a user. Accordingly, this enables resolving the problem that a telephone number other than the own telephone number known to the other party is known to the other party of the communication, and that the other party of the communication receives a call from an unknown telephone number and thus he or she gets confused because he or she does not know who is calling.

B. Second Embodiment

Figure 9:
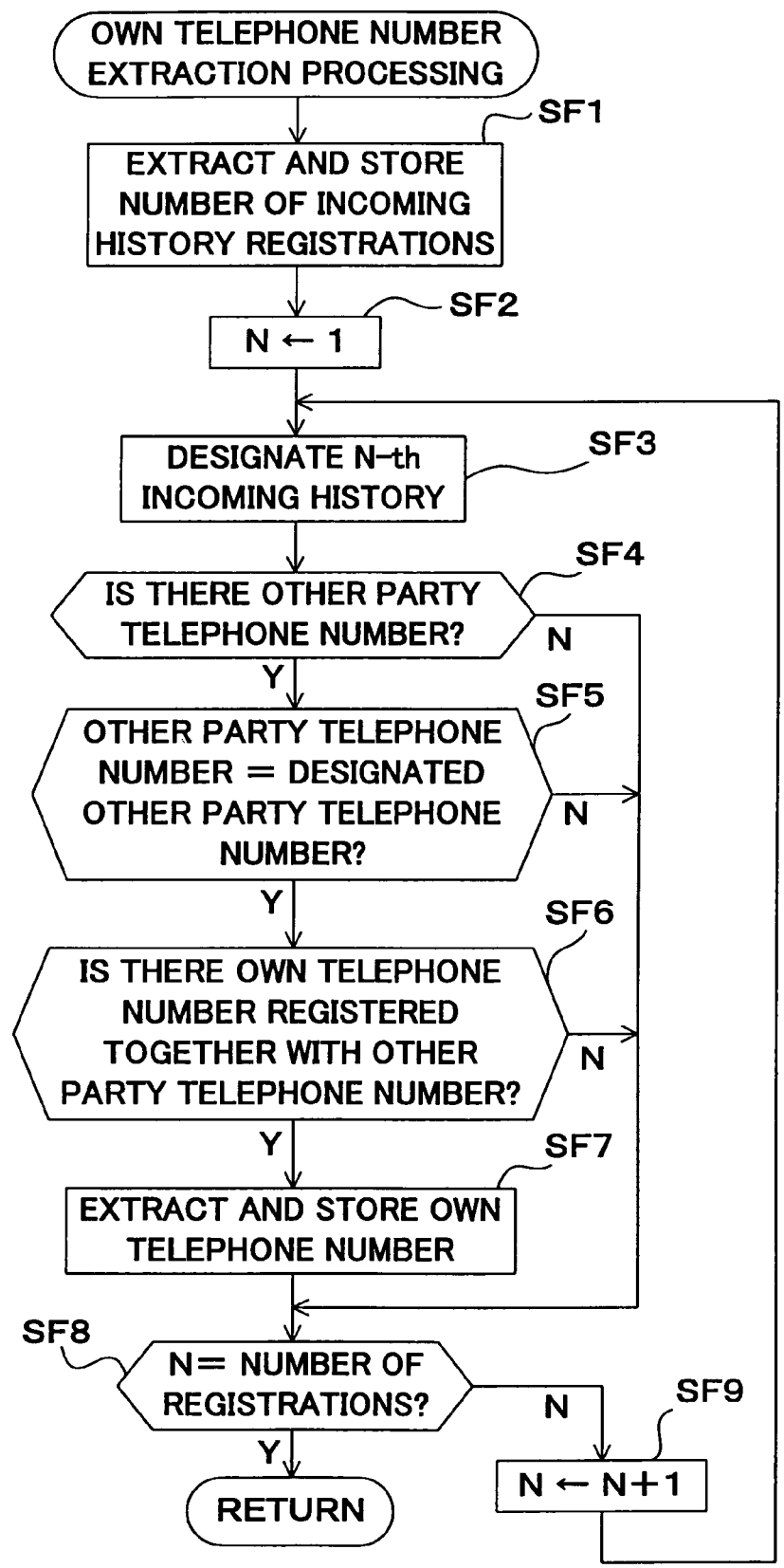
FIG. 9 is a flowchart of own telephone number extraction processing according to a second embodiment.

Next, the operation of the own telephone number extraction processing according to the second embodiment will be described with reference to FIG. 9. As is the case with the above-described first embodiment, when the own telephone number extraction processing is executed according to the second embodiment via Step SB4 (see FIG. 4) of the processing at call transmission, the control section 13 advances the processing to Step SF1 shown in FIG. 9, and extracts the number of incoming call history registrations in the incoming call history accommodation section 14b. Subsequently, in Step SF2, the default value "1" is stored to the pointer N for designating an incoming call history number. Note that, the default value "1" is a value for designating the latest (leading-off) history in the incoming call histories.

Next, in Step SF3, the Nth incoming call history designated by the pointer N is designated among the incoming call histories registered in the incoming call history accommodation section 14b. Further, in Step SF4, it is judged whether or not the other party telephone number has been registered in the designated incoming call history. If the other party telephone number has not been registered, the judgment result is "NO," and the processing advances to Step SF8. In Step SF8, it is judged whether or not the value of the pointer N has reached the number of incoming call history registrations extracted in the above-described Step SF1, that is, whether or not search of all incoming call histories is complete. If the search of all incoming call histories is complete, the judgment result is "YES," and the present processing is terminated. If the search is not complete, the judgment result is "NO," the processing advances to Step SF9, in which the pointer N is incremented for stepping, and the processing is returned to the above-described Step SF3.

Further, if the other party telephone number has been registered in the incoming call history designated by the incremented pointer N, the judgment result of the above-described Step SF4 is "YES," and the processing advances to Step SF5. In Step SF5, it is judged whether or not the other party telephone number stored in the incoming call history designated by the pointer N agrees with the other party telephone number temporarily stored in the work area of the memory 16 in the above-described Step SB3 (see FIG. 4), that is, whether or not the other party telephone number is an other party telephone number to which a call was made previously. If the other party telephone number is not an other party telephone number to which a call was made previously, the judgment result is "NO," and the processing advances to Step SF8.

On the other hand, if the other party telephone number is an other party telephone number to which a call was made previously, the judgment result of the above-described Step SF5 is "YES," and the processing advances to Step SF6. In Step SF6, it is judged whether or not an own telephone number has been registered together with the other party telephone number in the incoming call history designated by the pointer N. If an own telephone number has not been registered together with the other party telephone number, the judgment result is "NO," and the processing is advanced to Step SF8. On the other hand, if an own telephone number has been registered together with the other party telephone number, the judgment result is "YES," the processing advances to Step SF7, in which the own telephone number is extracted from the incoming call histories and is temporarily stored in the work area of the memory 16, and the present processing is terminated.

As described above, in the own telephone number extraction processing according to the second embodiment, all other party telephone numbers for which a call transmission is instructed are searched from the incoming call histories, and all own telephone numbers that are respectively correlated to the applicable other party telephone numbers are extracted. Therefore, all extracted own telephone numbers are displayed, and the user is made to select the own telephone number which is used for call transmission among them. Accordingly, in the case where a plurality of own telephone numbers are known to the other party, the intention of the user can be reflected when selecting the own telephone number to be used for call transmission.

C. Third Embodiment

Figure 10:
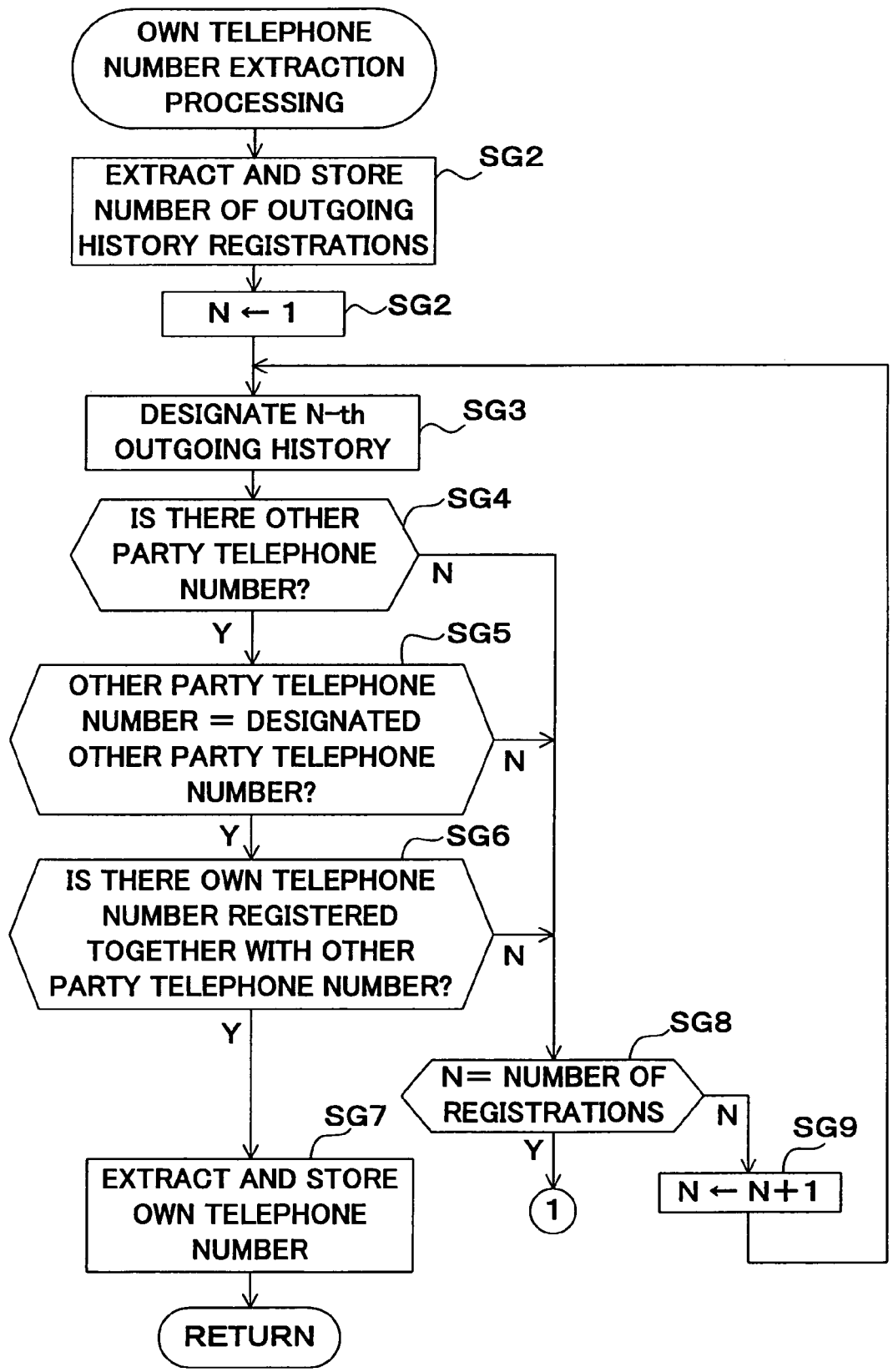
FIG. 10 is a flowchart of own telephone number extraction processing according to a third embodiment.

Next, the operation of the own telephone number extraction processing according to the third embodiment will be described with reference to FIGS. 10 and 11. As is the case with the above-described first embodiment, when the own telephone number extraction processing according to the third embodiment is executed via Step SB4 (see FIG. 4) of the processing at call transmission, the control section 13 advances the processing to Step SG1 shown in FIG. 10, in which the number of outgoing call history registrations in the outgoing call history accommodation section 14*a* is extracted. Subsequently, in Step SG2, the default value "1" is stored to the pointer N for designating the outgoing call history number. Note that, the default value "1" is a value for designating the latest (leading-off) history in the outgoing call histories.

Next, in Step SG3, the Nth outgoing call history designated by the pointer N is designated among the outgoing call histories registered in the outgoing call history accommodation section 14*a*. Further, in Step SG4, it is judged whether or not the other party telephone number has been registered in the designated outgoing call history. If the other party telephone number has not been registered, the judgment result is "NO," and the processing advances to Step SG8. In Step SG8, it is judged whether or not the value of the pointer N has reached the number of outgoing call history registrations extracted in the above-described Step SG1, that is, whether or not search of all outgoing call histories is complete. If the search is not complete, the judgment result is "NO," the processing advances to Step SG9, in which the pointer N is incremented for stepping, and the processing is returned to the above-described Step SG3.

Further, if the other party telephone number has been registered in the outgoing call history designated by the incremented pointer N, the judgment result of the above-described Step SG4 is "YES," and the processing advances to Step SG5. In Step SG5, it is judged whether or not the other party telephone number stored in the outgoing call history designated by the pointer N agrees with the other party telephone number temporarily stored in the work area of the memory 16 in the above-described Step SB3 (see FIG. 4), that is, whether or not the other party telephone number is an other party telephone number to which a call was made previously. If the other party telephone number is not an other party telephone number to which a call was made previously, the judgment result is "NO," and the processing advances to Step SG8.

On the other hand, if the other part telephone number is the other party telephone number which was received previously, the judgment result of the above-described Step SG5 is "YES," and the processing advances to Step SG6. In Step SG6, it is judged whether or not an own telephone number has been registered together with the other party telephone number in the incoming call history designated by the pointer N. If an own telephone number has not been registered together with the other party telephone number, the judgment result is "NO," and the processing is advanced to Step SG8. On the other hand, if an own telephone number has been registered together with the other party telephone number, the judgment result is "YES," the processing advances to Step SG7, in which the own telephone number is extracted from the outgoing call histories and is temporarily stored in the work area of the memory 16, and the present processing is terminated.

Figure 11:
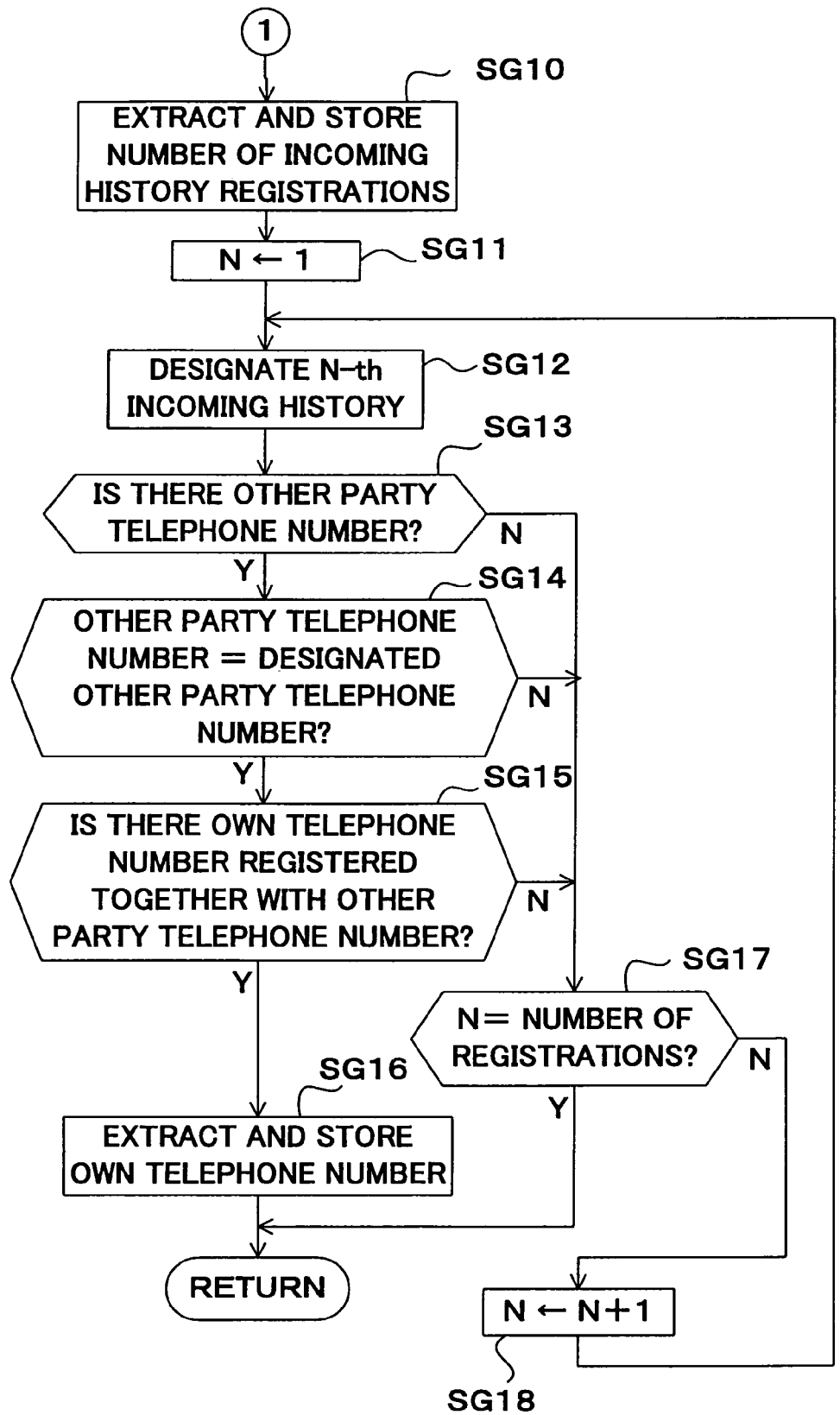
FIG. 11 is a flowchart of own telephone number extraction processing according to a third embodiment.

Meanwhile, if the search of all outgoing call histories is complete without the own telephone number correlated to the other party telephone number for which a call transmission is instructed being extracted from the outgoing call histories, the judgment result of the above-described Step SG8 is "YES," and the processing is advanced to Step SG10 shown in FIG. 11, in which the number of incoming call history registrations in the incoming call history accommodation section 14*b* is extracted. Subsequently, in Step SG11, the default value "1" is stored to the pointer N for designating the incoming call history number. Next, in Step SG12, the Nth incoming call history designated by the pointer N is designated among the incoming call histories registered in the incoming call history accommodation section 14*b*.

Further, in Step SG13, it is judged whether or not the other party telephone number has been registered in the designated incoming call history. If the other party telephone number has not been registered, the judgment result is "NO," and the processing advances to Step SG17. In Step SG17, it is judged whether or not the value of the pointer N has reached the number of incoming call history registrations extracted in the above-described Step SG10, that is, whether or not the search of all incoming call histories is complete. If the search of all incoming call histories is complete, the judgment-result is "YES," and the present processing is terminated. If the search is not complete, the judgment result is "NO," the processing advances to Step SG18, in which the pointer N is incremented for stepping, and the processing is returned to the above-described Step SG12.

Further, if the other party telephone number has been registered in the incoming call history designated by the incremented pointer N, the judgment result of the above-described Step SG13 is "YES," and the processing advances to Step SG14. In Step SG14, it is judged whether or not the other party telephone number stored in the incoming call history designated by the pointer N agrees with the other party telephone number temporarily stored in the work area of the memory 16 in the above-described Step SB3 (see FIG. 4), that is, whether or not the other party telephone number is an other party telephone number which was received previously. If the other party telephone number is not an other party telephone number which was received previously, the judgment result is "NO," and the processing advances to the above-described Step SG17.

On the other hand, if the other party telephone number is an other party telephone number which was received previously, the judgment result of the above-described Step SG14 is "YES," and the processing advances to Step SG15. In Step SG15, it is judged whether or not an own telephone number has been registered together with the other party telephone number in the incoming call history designated by the pointer N. If an own telephone number has not been registered together with the other party telephone number, the judgment result is "NO," and the processing is advanced to the above-described Step SG17. On the other hand, if an own telephone number has been registered together with the other party telephone number, the judgment result is "YES," and the processing advances to Step SG16, in which the own telephone number is extracted from the incoming call histories, is temporarily stored in the work area of the memory 16, and the present processing is terminated.

As described above, in the own telephone number extraction processing according to the third embodiment, the other party telephone number for which a call transmission is instructed is searched from the outgoing call history, and if the applicable other party telephone number has been registered, the own telephone number correlated to the other party telephone number, that is, the own telephone number used in the call with the other party telephone number which was transmitted previously is extracted from the outgoing call histories. On the other hand, if the own telephone number used in the call with the other party telephone number has not been registered in the outgoing call histories, the other party telephone number for which a call transmission is instructed is searched from the incoming call histories. If the applicable other party telephone number has been registered, the own telephone number correlated to the other party telephone number, that is, the own telephone number used in the call with the other party telephone number which was received previously is extracted from the incoming call histories. Therefore, in the case where the other party telephone number is stored in both the outgoing call histories and the incoming call histories, preference is given to the outgoing call histories. Accordingly, the intention of the user rather than the intention of the party on the other end of the call can be preferentially reflected when selecting the own telephone number to be used in an outgoing call.

D. Fourth Embodiment

Figure 12:
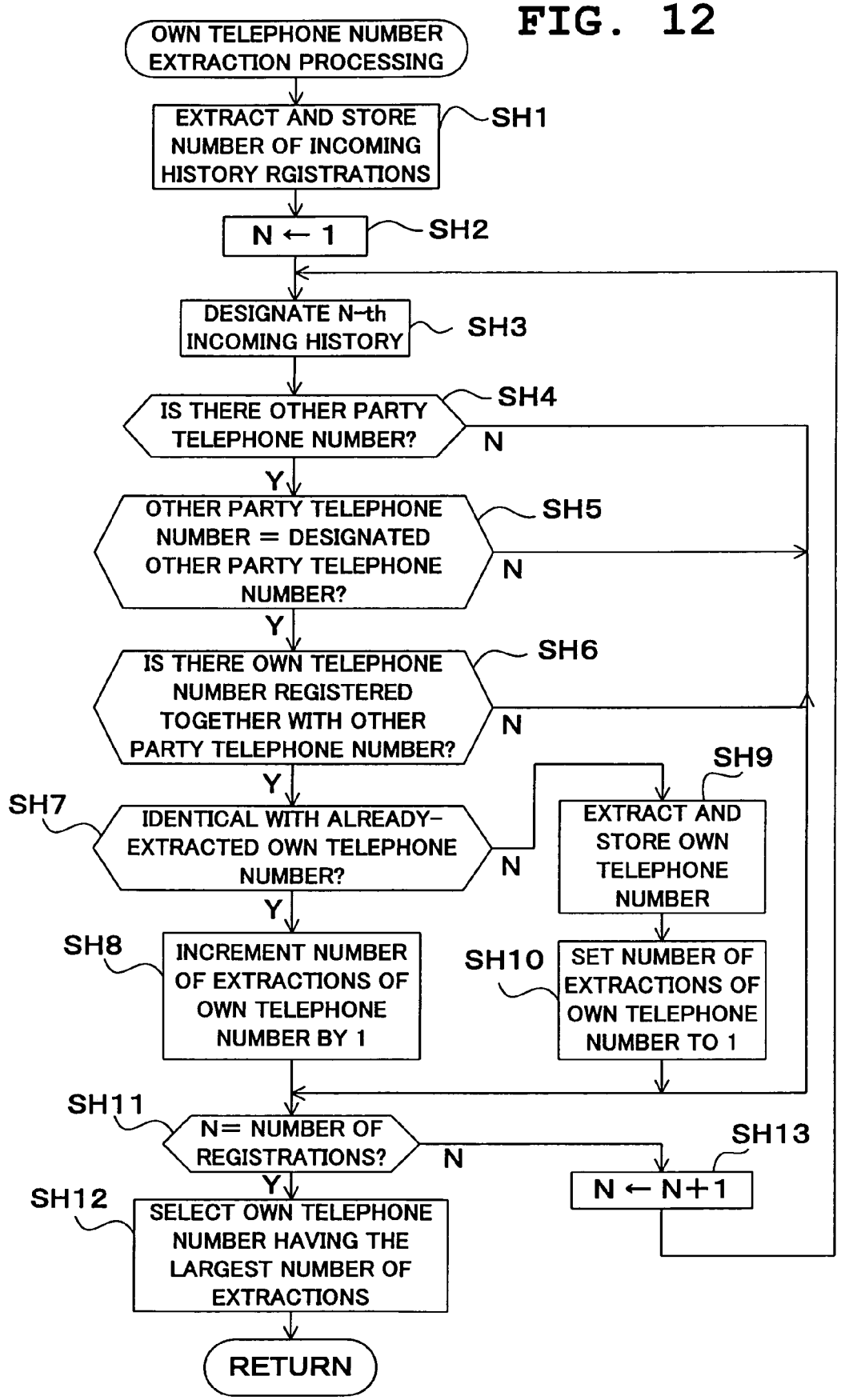
FIG. 12 is a flowchart of own telephone number extraction processing according to a fourth embodiment.

Next, the operation of the own telephone number extraction processing according to the fourth embodiment will be described with reference to FIG. 12. As is the case with the above-described first embodiment, when the own telephone number extraction processing according to the fourth embodiment is executed via Step SB4 (see FIG. 4) of the processing at call transmission, the control section 13 (including the function of a counting means) advances the processing to Step SH1 shown in FIG. 12, in which it extracts the number of incoming call history registrations in the incoming call history accommodation section 14b. Subsequently, in Step SH2, the default value "1" is stored to the pointer N for designating the incoming call history number. Note that, the default value "1" is a value for designating the latest (leading-off) history in the incoming call histories.

Next, in Step SH3, the Nth incoming call history designated by the pointer N is designated among the incoming call histories registered in the incoming call history accommodation section 14b. Further, in Step SH4, it is judged whether or not the other party telephone number has been registered in the designated incoming call history. If the other party telephone number has not been registered, the judgment result is "NO," and the processing advances to Step SH11. In Step SH11, it is judged whether or not the value of the pointer N has reached the number of incoming call history registrations extracted in the above-described Step SH1, that is, whether or not search of all incoming call histories is complete. If the search is not complete, the judgment result is "NO," the processing advances to Step SH13, in which the pointer N is incremented for stepping, and the processing is returned to the above-described Step SH3.

Further, if the other party telephone number has been registered in the incoming call history designated by the incremented pointer N, the judgment result of the above-described Step SH4 is "YES," and the processing advances to Step SH5. In Step SH5, it is judged whether or not the other party telephone number stored in the incoming call history designated by the pointer N agrees with the other party telephone number temporarily stored in the work area of the memory 16 in the above-described Step SB3 (see FIG. 4), that is, whether or not the other party telephone number is an other party telephone number which was received previously. If the other party telephone number is not an other party telephone number which was received previously, the judgment result is "NO," and the processing advances to the above-described Step SH11.

On the other hand, if the other party telephone number is an other party telephone number which was received previously, the judgment result of the above-described Step SH5 is "YES," and the processing advances to Step SH6. In Step SH6, it is judged whether or not an own telephone number has been registered together with the other party telephone number in the incoming call history designated by the pointer N. If an own telephone number has not been registered together with the other party telephone number, the judgment result is "NO," and the processing advances to the above-described Step SH11.

On the other hand, if an own telephone number has been registered together with the other party telephone number, the judgment result is "YES," and the processing advances to Step SH7, in which it is judged whether or not the own telephone number registered together with the other party telephone number is identical with the own telephone number which has been already extracted. If identical, the judgment result is "YES," the processing advances to Step SH8, in which the number of extractions of the own telephone number is incremented, and the processing advances to Step SH11. On the other hand, if not identical, the judgment result is "NO," the processing advances to Step SH9, in which the own telephone number registered together with the other party telephone number is extracted from the incoming call histories and temporarily stored in the work area of the memory 16. Next, in Step SH10, the number of extractions of the own telephone number is set to "1" and subsequently the processing advances to Step SH11.

Thereafter, by repeating Step SH3 and thereafter as described above until the value of the pointer N reaches the number of incoming call history registrations, the own telephone number used in the call with the other party telephone number which was received previously is extracted from the incoming call histories, and the number of extractions is counted for each own telephone number. Further, when the value of the pointer N reaches the number of incoming call history registrations and the search of all incoming call histories is complete, the judgment result of Step SH11 is "YES," and the processing advances to Step SH12. In Step SH12, the own telephone number which has the largest number of extractions is selected from the own telephone numbers temporarily stored in the work area of the memory 16 as the own telephone number to be used for the call transmission, and the present processing is terminated.

As described above, in the own telephone number extraction processing according to the fourth embodiment, the own telephone number used in the call with the other party telephone number which was received previously is extracted from the incoming call histories. At the same time, the number of extractions (corresponding to the number of detections counted by the counting means) is counted for each own telephone number is counted, and the own telephone number which has the largest number of extractions is selected as the own telephone number to be used for a call transmission. Therefore, in the case where a plurality of own telephone numbers have been known to the other party, the own telephone number which was used frequently in the communication with the other party can be used.

Note that, in the above-described first to fourth embodiments, description is given on the cellular phone 100 which selectively uses a plurality of own telephone numbers. However, the summary of the invention is not limited to this cellular phone 100, and the invention may be applied to a communication terminal having a plurality of mail addresses. In this case, a communication history accommodation section is provided for accommodating communication histories in which at least an other party mail address to which communication is made are correlated to the own mail addresses used in that communication, and when sending an E-mail it is judged whether or not the other party mail address to which the E-mail is to be sent is the other party mail address to which a mail communication was made previously with reference to the communication histories. If the other party is an other party to whom the E-mail communication was made previously, the own mail address which was used at that time is extracted from the communication histories for sending a mail. Therefore, it is possible to prevent an own mail address other than the own mail address known to the other party of the communication among the plurality of own mail addresses from being used for E-mail transmission because of an operational error or misunderstanding of a user. Accordingly, this enables resolving the problem that a mail address other than the own mail address known to the other party is known to the other party of the communication, and that the other party of the communication receives an incoming E-mail from an unknown mail address and thus he or she gets confused because he or she does not know who is sending the E-mail.

Furthermore, although the computer program product of the mobile communication terminal which is a preferred embodiment of the present invention is stored in the memory (for example, ROM, etc.) of the mobile communication terminal, this processing program is stored on a computer-readable medium and should also be protected in the case of manufacturing, selling, etc. of only the program. In that case, the method of protecting the program with a patent will be realized by the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. A mobile communication terminal for selectively using a plurality of pieces of own identification information for communication, comprising:
   own identification storage means for storing a plurality of own identification information;
   a communication history storage means for storing communication histories including other party identification information of a communication terminal of another party on the other end of a call;
   a correlating means for correlation of at least one of said own identification information and at least one of said other party identification information stored in a communication history;
   an extraction means for extracting the own identification information to be used for the communication, when initiating a communication with the communication terminal of the other party, on the basis of the other party identification information of the communication terminal of the other party and the communication histories stored in the communication history storage means; and
   a communication initiation means for initiating a communication with the communication terminal of the other party using the own identification information extracted by the extraction means.

2. The mobile communication terminal according to claim 1, wherein the extraction means comprises:
   a judgment means for judging whether or not the communication history including the other party identification information of the communication terminal of the other party is stored in the communication history storage means; and
   a detection means for detecting said own identification information stored in a state being correlated to the other party identification information when the judgment means judges that the communication history is stored,
   wherein the extraction means extracts said own identification information detected by the detection means as the own identification information to be used for a communication.

3. The mobile communication terminal according to claim 2, wherein, when a plurality of pieces of own identification information is detected by the detection means, the extraction means extracts said own identification information selected by the operation by a user from the detected plurality of pieces of own identification information.

4. The mobile communication terminal according to claim 1, wherein the extraction means comprises:
   a judgment means for judging whether or not the communication history including the other party identification information of the communication terminal of the other party is stored in the communication history storage means;
   a detection means for detecting said own identification information stored in a state being correlated to the other party identification information when the judgment means judges that the communication history is stored; and
   a counting means for counting the number of detections detected by the detection means for each own identification information,
   wherein the extraction means extracts the own identification information which has the largest number of detections counted by the counting means as the own identification information to be used for communication among the own identification information detected by the detection means.

5. A mobile communication terminal for selectively using a plurality of pieces of own identification information for communication, comprising:
   own identification storage means for storing a plurality of own identification information;
   an outgoing call history storage means for storing an outgoing call history including other party identification information of a communication terminal of another party to which a call is made;
   an incoming call history storage means for storing an incoming call history including the other party identification information of a communication terminal of the other party from which a call is received;
   a correlating means for correlation of at least one of said own identification information and at least one of said other party identification information stored in at least one of said outgoing call history and said incoming call history;
   a first determination means for determining whether or not the other party identification information of the communication terminal of the other party is the other party identification information to which a call was made previously with reference to the outgoing call histories stored in the outgoing call history storage means, when initiating a communication with the communication terminal of the other party, a first extraction means for extracting said own identification information correlated to the other party identification information from the outgoing call histories stored in the outgoing call history storage means, when the first determination means determines that the other party identification information is not the other party identification information to which a call was made previously;

a second determination means for determining whether or not the other party identification information of the communication terminal of the other party is the other party identification information from which a call was received previously with reference to the incoming call histories stored in the incoming call history storage means, when the first determination means determines that the other party identification information is not the other party identification information which was received previously;

a second extraction means for extracting said own identification information correlated to the other party identification information from the incoming call histories stored in the incoming call history storage means, when the second determination means determines that the other party identification information is the other party identification information which was received previously; and a communication initiation means for initiating a communication with the communication terminal of the other party using the own identification information extracted by either one of the first extraction means or the second extraction means.

6. A mobile communication terminal storing a program executed by a processor in the mobile communication terminal the program comprising:

an own identification storage processing step of storing a plurality of own identification information in own identification storage;

a communication history storage processing step of storing communication histories including other party identification information of a communication terminal of another party to which a communication is made;

a correlation processing step of correlating at least one of said own identification information and at least one of said other party identification information stored in a communication history;

an extraction processing step of extracting said own identification information to be used for the communication on the basis of the other party identification information of the communication terminal of the other party and the communication history stored in the communication history storage processing step, when initiating a communication with the communication terminal of the other party; and a communication initiation processing step of initiating a communication with the communication terminal of the other party using the own identification information extracted by the extraction means.

7. A mobile communication terminal storing a program executed by a processor in the mobile communication terminal, the program comprising:

an own identification storage processing step of storing a plurality of own identification information in own identification storage;

an outgoing call history storage processing step of storing an outgoing call history including other party identification information of a communication terminal of another party to which a call is made;

an incoming call history storage processing step of storing an incoming call history including the other party identification information of a communication terminal of the other party from which a call is received;

a correlation processing step of correlating at least one of said own identification information and at least one of said other party identification information stored in at least one of said outgoing call history and said incoming call history;

a first determination processing step of determining whether or not the other party identification information of the communication terminal of the other party is the other party identification information to which a call was made previously with reference to the outgoing call histories stored in the outgoing call history storage processing step, when initiating a communication with the communication terminal of the other party;

a first extraction processing step of extracting said own identification information correlated to the other party identification information from the outgoing call histories stored in the outgoing call history storage processing step, when the first determination processing step determines that the other party identification information is not the other party identification information to which a call was made previously;

a second determination processing step of determining whether or not the other party identification information of the communication terminal of the other party is the other party identification information from which a call was received previously with reference to the incoming call histories stored in the incoming call history storage processing step, when the first determination processing step determines that the other party identification information is not the other party identification information which was received previously;

a second extraction processing step of extracting said own identification information correlated to the other party identification information from the incoming call histories stored in the incoming call history storage processing step, when the second determination processing step determines that the other party identification information is the other party identification information which was received previously; and a communication initiation processing step of initiating a communication with the communication terminal of the other party using the own identification information extracted by either one of the first extraction processing step or the second extraction processing step.

* * * * *